United States Patent
Golan et al.

(10) Patent No.: US 11,216,654 B2
(45) Date of Patent: Jan. 4, 2022

(54) METHODS AND SYSTEMS FOR DROWNING DETECTION

(71) Applicant: CORAL DETECTION SYSTEMS LTD., Zichron Yaacov (IL)

(72) Inventors: Eyal Golan, Zichron Yaacov (IL); Tamar Avraham, Haifa (IL)

(73) Assignee: CORAL DETECTION SYSTEMS LTD., Zichron Yaacov (IL)

(*) Notice: Subject to any disclaimer, the term of this patent is extended or adjusted under 35 U.S.C. 154(b) by 114 days.

(21) Appl. No.: 16/072,581

(22) PCT Filed: Jan. 19, 2017

(86) PCT No.: PCT/IL2017/050081
§ 371 (c)(1),
(2) Date: Jul. 25, 2018

(87) PCT Pub. No.: WO2017/130187
PCT Pub. Date: Aug. 3, 2017

(65) Prior Publication Data
US 2019/0034712 A1    Jan. 31, 2019

Related U.S. Application Data

(60) Provisional application No. 62/287,165, filed on Jan. 26, 2016.

(51) Int. Cl.
*G06K 9/00* (2006.01)
*G08B 21/08* (2006.01)
(Continued)

(52) U.S. Cl.
CPC ..... *G06K 9/00335* (2013.01); *G06K 9/00771* (2013.01); *G06K 9/4628* (2013.01);
(Continued)

(58) Field of Classification Search
None
See application file for complete search history.

(56) References Cited

U.S. PATENT DOCUMENTS 6,133,838 A * 10/2000 Meniere ............... G08B 21/082
340/566
7,330,123 B1    2/2008 Grahn et al.
(Continued)

FOREIGN PATENT DOCUMENTS

CN    103413114    11/2013

OTHER PUBLICATIONS

Robust Human Detection Within a Highly Dynamic Aquatic Environment in Real Time. Eng.et al. (Year: 2006).*
(Continued)

*Primary Examiner* — Delomia L Gilliard
(74) *Attorney, Agent, or Firm* — Browdy and Neimark, P.L.L.C.

(57) ABSTRACT

It is provided a method of detecting human drowning, comprising: attempting to detect humans in a sequence of underwater images taken by a single camera, for identifying humans-in-water candidates in the images, said detection using at least a machine learning algorithm, tracking humans-in-water candidates throughout this sequence, and detecting human drowning risk. It is also provided a system for detecting human drowning, comprising at least one underwater camera configured to take at least a sequence of underwater images, the system being configured to attempt to detect humans in the sequence of underwater images, for identifying humans-in-water candidates in the images, said detection using at least a machine learning algorithm, track humans-in-water candidates throughout this sequence, and detect human drowning risk.

19 Claims, 8 Drawing Sheets

(51) Int. Cl.
  *G06K 9/46* (2006.01)
  *G06K 9/62* (2006.01)
  *G06T 7/73* (2017.01)
  *G06N 3/08* (2006.01)
  *G06T 7/00* (2017.01)
  *G06T 7/20* (2017.01)
  *H04N 7/18* (2006.01)
  *G08B 29/18* (2006.01)

(52) U.S. Cl.
  CPC ............ *G06K 9/6271* (2013.01); *G06N 3/08* (2013.01); *G06T 7/0002* (2013.01); *G06T 7/20* (2013.01); *G06T 7/73* (2017.01); *G08B 21/08* (2013.01); *H04N 7/185* (2013.01); *G08B 21/084* (2013.01); *G08B 29/188* (2013.01)

(56) References Cited

U.S. PATENT DOCUMENTS

| | | | | |
|---|---|---|---|---|
| 9,640,058 | B1* | 5/2017 | Bollman | G08B 21/084 |
| 9,972,188 | B2* | 5/2018 | AlMahmoud | G08B 21/08 |
| 2009/0189981 | A1* | 7/2009 | Siann | H04N 7/183 |
| | | | | 348/143 |
| 2010/0176956 | A1* | 7/2010 | Moerschell | E04H 4/06 |
| | | | | 340/573.6 |
| 2012/0269399 | A1 | 10/2012 | Anderson et al. | |
| 2014/0267736 | A1* | 9/2014 | DeLean | G08B 13/19613 |
| | | | | 348/152 |
| 2014/0333775 | A1* | 11/2014 | Naikal | H04N 7/181 |
| | | | | 348/159 |
| 2015/0107015 | A1* | 4/2015 | Ng | E04H 4/06 |
| | | | | 4/504 |
| 2015/0139485 | A1* | 5/2015 | Bourdev | G06K 9/6292 |
| | | | | 382/103 |
| 2015/0294192 | A1 | 10/2015 | Lan | |
| 2016/0037138 | A1* | 2/2016 | Udler | G06K 9/00771 |
| | | | | 348/143 |
| 2019/0303684 | A1* | 10/2019 | Khadloya | G06K 9/00771 |

OTHER PUBLICATIONS

DEWS: A Live Visual Surveillance System for Early Drowning Detection at Pool. Eng et al. (Year: 2008).*
Hsi-Lin Chen et al: "A Hidden Markov Model-based approach for recognizing swimmer's behaviors in swimming pool", Machine Learning and Cybernetics (ICMLC), 2010 International Conference ON, IEEE, Piscataway, NJ, USA, Jul. 11, 2010 (Jul. 11, 2010), pp. 2459-2465, XP031759889.
How-Lung Eng et al: "DEWS: A Live Visual Surveillance System for Early Drowning Detection at Pool" ,IEEE Transactions on Circuits and Systems for Video Technology, Institute of Electrical and Electronics Engineers,US, vol. 18, No. 2,Feb. 1, 2008 (Feb. 1, 2008), pp. 196-210, XP01120253.
Lei Fei et al: "Drowning Detection Based on Background Subtraction", Embedded Software and Systems, 2009. ICESS '09. International Conference ON, IEEE, Piscataway, NJ, USA, May 25, 2009 (May 25, 2009), pp. 341-343, XP031469380.
N. Dalal, B. Triggs. "Histograms of oriented gradients for human detection." Computer Vision and Pattern Recognition, 2005 CVPR 2005. IEEE Computer Society Conference on. vol. 1. IEEE, 2005.
P. Felzenszwalb, R. Girshick, D. McAllester, D. Ramanan, Object Detection with Discriminatively Trained Part Based Models, IEEE Transactions on Pattern Analysis and Machine Intelligence, vol. 32, No. 9, Sep. 2010.
Divvala, Santosh K., Alexei A. Efros, and Martial Hebert. "How important are "Deformable Parts" in the Deformable Parts Model?" Computer Vision—ECCV 2012. Workshops and Demonstrations. Springer Berlin Heidelberg, 2012.
R. Girshick, P. Felzenszwalb, D. McAllester. "Discriminatively Trained Deformable Part Models, Release 4", http://people.cs.uchicago.edu/~pff/latent-release4/—May 2, 2015.

* cited by examiner

METHODS AND SYSTEMS FOR DROWNING DETECTION

PRIORITY

The present application claims priority of U.S. 62/287,165.

TECHNICAL FIELD

The presently disclosed subject matter relates to detection of human drowning.

BACKGROUND

In the US alone there is an annual average of 683 fatal drowning in residential swimming pools (source: CDC). 30% of death among ages 1-4 is caused by drowning, while at those ages 50.1% of fatal incidents and 64.6% of nonfatal incidents occur in swimming pools. Over 3300 are treated in emergency rooms, annually, as a results of drowning, or near-drowning events.

Safety means that aim to reduce such accidents include fences, pool covers, alarms based on floats, wearable devices, and video analytics based systems. Fences, pool covers, and float-based alarms prevent access to the water, while armed, but are not active once disarmed, and do not work while the pool is in use. Therefore, relying on those means alone means that during standard pool use, the only safety mean is adult supervision, which can be sometimes distracted. Moreover, float-based alarms are sensitive to any water movement and therefore cannot be activated while the pool cleaner robot is in use. Wearable devices include floaties for infants and young children, and wearable bracelets or necklaces for bigger kids. All those require the responsible adults to force and supervise wearing the items, and require to have enough units for all the kids at all times.

There are several video analytic based products/methods that aim to prevent drowning. Some use only above water cameras, and either aim to detect entrance to the pool or to detect early stress signs. These systems suffer from the difficulty to distinguish between stress signs and normal playing movements.

There are systems that use underwater cameras as well, and intend to detect near drowning events by recognizing lack of movement of a submerged person. However, they are based on a technology that requires that each point inside the pool be viewed by at least two cameras. Data from multiple cameras is used when detecting objects/people, tracking them, and for deciding whether they are in a drowning risk. These systems were designed for commercial pools, to be used as an assisting tool for lifeguards. These systems need to cover a very large body of water and therefore use several overhead and underwater cameras. These systems are very costly and require complicated installation.

GENERAL DESCRIPTION

In accordance with certain aspects of the presently disclosed subject matter, there is provided a method of detecting human drowning, comprising attempting to detect humans in a sequence of underwater images taken by a single camera, for identifying humans-in-water candidates in the images, said detection using at least a machine learning algorithm, tracking humans-in-water candidates throughout this sequence, and detecting human drowning risk.

According to some embodiments, the method is performed for each single camera of a plurality of cameras. For each single camera, the method comprises the steps of detecting humans in a sequence of underwater images taken by said camera, for identifying humans-in-water candidates in the images, said detection using at least a machine learning algorithm, tracking humans-in-water candidates throughout this sequence and detecting human drowning risk.

According to some embodiments, the method comprises associating said candidates in each image with a model among a plurality of different models, each of the model being associated to a different subcategory. According to some embodiments, the identification of humans-in-water candidates comprises using HOG based features and SVM based classification. According to some embodiments, the method comprises modelling each subcategory by deformable parts. According to some embodiments, wherein each model is obtained by training a machine learning algorithm based on the input of a training set of underwater images clustered to subcategories. According to some embodiments, each subcategory is associated with a human posture. According to some embodiments, the underwater images of the training set which comprise a human are pre-clustered. According to some embodiments, the method comprises a step of pre-clustering the underwater images of the training set which comprise a human, the pre-clustering comprising manually annotating the humans' joints, and automatically pre-clustering the underwater images based on postural features extracted from said annotations. According to some embodiments, the automatic pre-clustering uses pre-defined definitions of postural features to pre-cluster the underwater images. According to some embodiments, the automatic pre-clustering uses at least a data-driven clustering method. According to some embodiments, the method comprises replacing overlapping candidates associated with a model of the same subcategory by a new candidate with a weighted average location. According to some embodiments, each candidate comprises a score reflecting the pertinence of the association of the model of a subcategory with respect to the part covered by the candidate, and the location of the new candidate that replaces the overlapping candidates is defined by weighting the overlapping candidates' locations based on their said scores. According to some embodiments, the method comprises using another machine learning algorithm to classify if the candidates comprise a human. According to some embodiments, the machine learning algorithm is a deep convolutional neural network. According to some embodiments, the method comprises tracking said candidates throughout the sequence of images, by taking into account the subcategory to which each candidate is associated with, and detecting a lack of movement of the candidates, in order to detect human drowning risk. According to some embodiments, the method is used for detecting human drowning risk in at least a residual above-ground pool.

These embodiments can be combined according to any of their possible technical combination.

In accordance with certain aspects of the presently disclosed subject matter, there is provided a system for detecting human drowning, comprising at least one underwater camera configured to take at least a sequence of underwater images, the system being configured to attempt to detect humans in the sequence of underwater images, for identifying humans-in-water candidates in the images, said detection using at least a machine learning algorithm, track humans-in-water candidates throughout this sequence, and detect human drowning risk.

According to some embodiments, a plurality of cameras is used and the system is configured to, for each single camera, detect humans in a sequence of underwater images taken by said camera, for identifying humans-in-water candidates in the images, said detection using at least a machine learning algorithm, track humans-in-water candidates throughout this sequence and detect human drowning risk.

According to some embodiments, the machine learning algorithm comprises a deep learning neural network. According to some embodiments, the deep learning neural network comprises a convolutional neural network.

According to some embodiments, the system is further configured to raise an alarm based on the detection of human drowning risk. According to some embodiments, the system comprises a single underwater camera. According to some embodiments, the system is operable to detect human drowning risk without calibration with respect to its operating zone. According to some embodiments, the system uses an energy source comprising solar panels. According to some embodiments, the system is configured for detecting human drowning risk in at least a residual above-ground pool.

These embodiments can be combined according to any of their possible technical combination.

In accordance with certain aspects of the presently disclosed subject matter, there is provided a system for detecting human drowning, comprising a single underwater camera configured to take underwater images, an energy source comprising solar panels, and a processing unit configured to detect lack of movement of a human in water, based on images sensed by the single underwater camera.

In accordance with certain aspects of the presently disclosed subject matter, there is provided a non-transitory device readable by a machine, tangibly embodying a program of instructions executable by the machine to perform a method of detecting human drowning, comprising attempting to detect humans in a sequence of underwater images taken by a single camera, for identifying humans-in-water candidates in the images, said detection using at least a machine learning algorithm, tracking humans-in-water candidates throughout this sequence, and detecting human drowning risk.

According to some embodiments, the non-transitory device readable by a machine tangibly embodies a program of instructions executable by the machine to perform at least part or all the steps of the method of detecting human drowning described above.

According to some embodiments, it is described a video analytic based product/method that detects drowning or near drowning using underwater camera/cameras designed for private/residential pools.

According to some embodiments, the solution proposes an affordable device, which allows a simple installation and does not require the presence of an expert.

According to some embodiments, no complicated calibration is needed to install the device.

According to some embodiments, a solution which is designed especially for relatively small pools is described.

These embodiments can be combined according to any of their possible technical combination.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "detecting", "tracking", "associating". "clustering", or the like, refer to the action(s) and/or process(es) of a processor that manipulate and/or transform data into other data, said data represented as physical, such as electronic, quantities and/or said data representing the physical objects.

The term "processing unit" covers any computing unit or electronic unit that may perform tasks based on instructions stored in a memory, such as a computer, a server, a chip, etc. It encompasses a single processor or multiple processors, which may be located in the same geographical zone or may, at least partially, be located in different zones and may be able to communicate together.

Embodiments of the presently disclosed subject matter are not described with reference to any particular programming language. It will be appreciated that a variety of programming languages may be used to implement the teachings of the presently disclosed subject matter as described herein.

Figure 1:
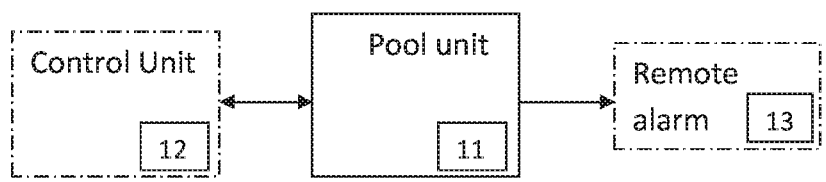
FIG. 1 is a general illustration of an embodiment of a system for detecting human drowning.

FIG. 1 illustrates an embodiment of a system for detecting human drowning, for instance in a pool. The system may comprise at least a pool unit 11, a remote alarm unit 12, and a control unit 13.

The remote alarm unit 12 may be located anywhere in a residence of a user or outside of it.

The system may comprise multiple remote alarm units. Such remote alarm units may be a part of the system (such as a remote alarm unit which is specific to the system), or may be units that are used for other applications or with other products and that the pool unit is paired with during the installation process or later.

The control unit 13 is operable on a processing unit and may comprise a control application. The control unit 13 may be installed e.g. on a smart phone, tablet, or any other computer, or on a dedicated control unit. This list is not limitative. The control unit 13 may also be part of the pool unit 11. It may allow a user to control or to interact with the pool unit 11.

Figure 2:
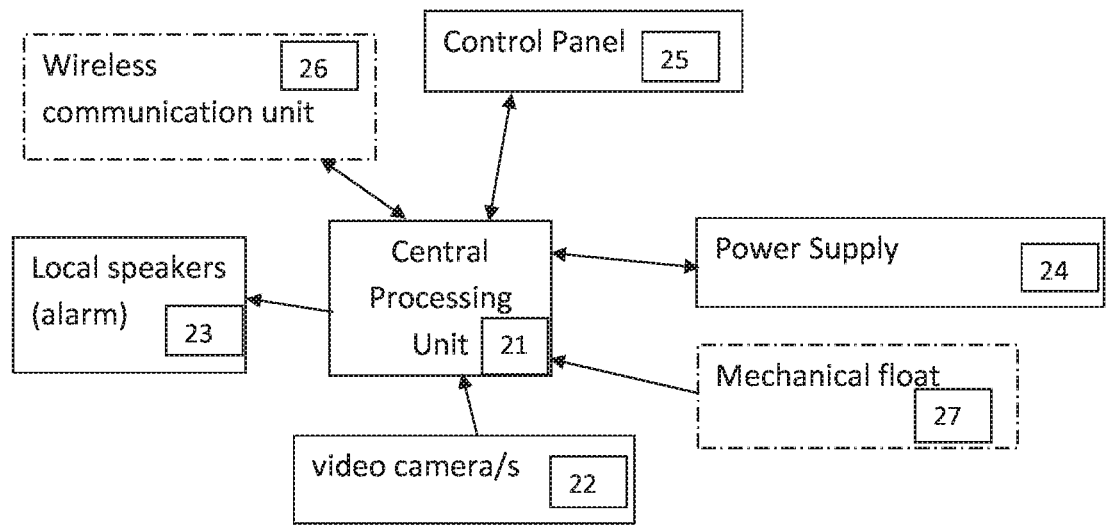
FIG. 2 illustrates a schematic high level block diagram of hardware components of a pool unit of the system for detecting human drowning.

An embodiment of the components that may be part of the pool unit's 11 is illustrated in FIG. 2. The pool unit 11 may comprise a central processing unit 21. The central processing unit may comprise for instance a CPU or multiple CPUs, a memory, GPUs (Graphical Processing Units), DSPs, FPGAs, other processing units, and a storage disk.

The pool unit 11 includes at least one video camera 22. According to some embodiments, the system's cameras may enable a full visual coverage of the pool. According to some embodiments, each camera covers a different part of the pool.

For small pools, a single camera with for example at least a 90 degrees of horizontal angle and at least 90 degrees of vertical angle may be used (these numbers being not limitative), while placing the pool unit in one of the pool's corners.

For midsized pools, two cameras may be used in a back-to-back manner, while locating the pool unit in the middle of one of the long edges of the pool.

For larger pools, more cameras may be used, while some may be considered as extensions, and may be located in different locations of the pool, so that all cameras together may supply full coverage of the pool.

The system may also comprise a local alarm 23 (such as a speaker) for alerting on drowning risks.

The system is fed with power by a power supply 24. According to some embodiments, it is supplied with power from an external source. According to some embodiments, the system may include solar panels and/or batteries.

The system may include a local control panel 25 that may include a small screen for user notifications, and may allow user input. In order to communicate with outer devices, like a remote alarm, or any remote control application, the system may comprise a communication unit 26, which may be a wireless communication unit that may use any wireless communication technology, such as Wi-Fi. or Bluetooth.

While the system runs a video analytics method (embodiments of which will be described afterwards), the pool unit may also comprise a mechanical float 27 that may be used to indicate whether there was an entrance to the pool. Such information may be used as complementary information to the insights of the video analytics method, or as the only source of information, e.g. in situations of low visibility (dirty water or darkness) or occlusions.

Figures 3A, 3B, 3C:
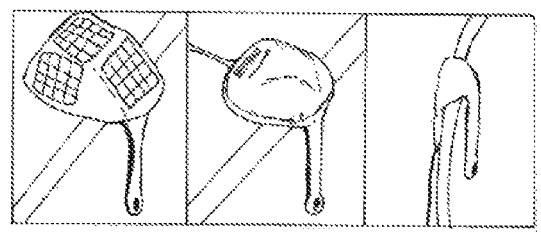
FIG. 3 illustrate different possible embodiment of the pool unit of the system, in particular for aboveground and underground pools.

As illustrated in FIG. 3, the system may be used both in upper-ground and/or underground pools. FIG. 3A illustrates an embodiment of a pool unit for underground pools that uses solar panels. FIG. 3B illustrates an embodiment of a pool unit for underground pools that uses auxiliary electricity. FIG. 3C illustrates an embodiment for a pool unit for aboveground pools. These examples are not limitative.

Figure 4:
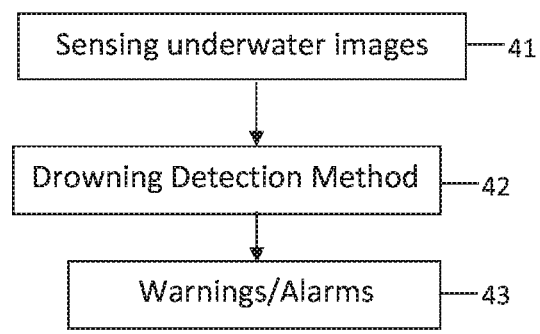
FIG. 4 illustrates a generalized flow chart of a drowning detection method that may be performed by the system.

FIG. 4 illustrates an embodiment of a method for drowning detection that may be performed by the system for drowning detection. The system senses underwater images (step 41) from the video camera/s. Video frames from each camera may be used as input for the drowning detection method (step 42), embodiments of which are described below. The drowning detection method may output warnings or alarms (step 43). These warnings or alarms may be at different levels of severity. As a consequence, the system may output different types of alarms/messages in the local speakers, and if applicable, in the local control panel, and/or in the remote control units and/or in the remote alarm units.

Figure 5:
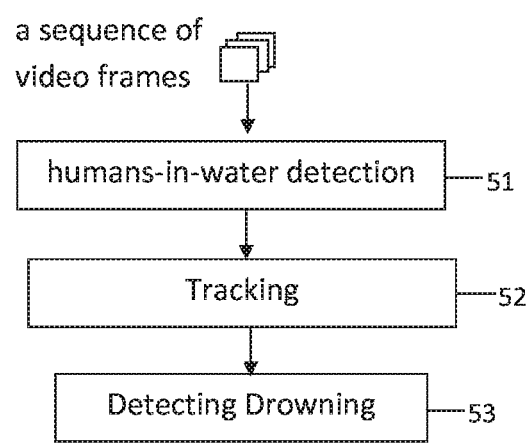
FIG. 5 illustrates a generalized flow chart of a drowning detection method.

Some embodiments of the drowning detection methods will now be described. As illustrated in FIG. 5, in order to detect drowning events, the method may comprise analyzing a sequence of video frames, which may represent underwater images taken by the cameras of the system. Processing steps, such as detection, comparison, tracking of elements may for instance be performed by the central processing unit of the pool unit 11.

The method may comprise a step 51 of detecting which image parts comprise humans underwater, and which do not. This detection may be applied on part of the video frames and may be applied in different resolutions of the images at different times and at different image parts. The detection applied on a video frame may output a confidence level for the presence of humans at each image part. This detection may output humans-in-water candidates in the images, which comprise parts of the image that are detected as comprising a human. According to some embodiments, this detection uses at least a machine learning algorithm, which may be trained with a training set of underwater images.

Each humans-in-water candidate may be tracked in the video frames using a visual tracking algorithm (step 52). The tracking method may be based for instance on Kalman filter. Partical Filters, mean shift, or any other visual tracking method. At each time, the chance for each track to be associated with a drowning event may be estimated (step 53). According to some embodiments, the drowning risk is estimated based on non-movement detection, while the body is being fully submerged in water.

Embodiments of humans-in-water detection algorithms that detect humans from underwater images, in particular from images obtained by a single camera, will now be described. Detecting humans submerged, or partly submerged, in water (as opposed to pedestrian detections, for instance), may comprise recognizing humans at a variety of postures.

The humans-in-water detection/recognition methods may be based on machine learning algorithms that are pretrained.

Figure 6:
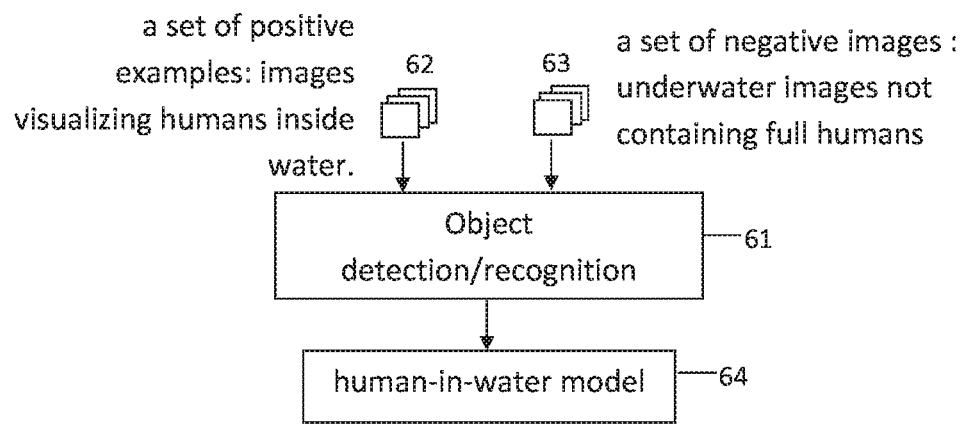
FIG. 6 illustrates an embodiment of the general sketch of a training stage of a machine learning based humans-in-water recognition/detection method.

FIG. 6 is a general illustration of a possible training stage of a humans-in-water object detection/recognition algorithm 61. This algorithm may be pre-operable on a processing unit that is not part of the pool unit (an embodiment is a personal computer or a cluster of computers), or can partly run on different computers and then further run on the pool units' processing unit. The algorithm 61 may be fed with a training set of underwater images. This training set may comprise "positive" examples 62, which means that the underwater images comprise humans-in-water, and a set of "negative" examples 63 that may comprise any other images, such as underwater images without humans and underwater images with non-human objects.

According to some embodiments, the algorithm 61 outputs after the training stage a model or a plurality of models for humans-in-water. These models may be used to detect humans-in-water candidates in the underwater images. These models may comprise one or more visual representations (such as a particular distribution of pixels) that indicate the fact that a human is present in the underwater image.

The algorithm 61 may in particular comprise a machine learning algorithm. This machine learning algorithm may use any SVMs (Support Vector Machines), any neural network based technology, including the deep learning technology, CNN (Convolutional neural networks), Decision Trees/Forests based technologies, Bag-of-words based technology, HOG (Histogram Of Gradients) based technology, DPM (Deformable Parts Model) based technology, or any other classification/modelling technology that aims to distinguish between different types of objects. It may use one or more of the abovementioned technologies.

The output humans-in-water models may model explicitly, or implicitly, multiple sub-categories, each associated, for instance, with a different human posture (as detailed later) or any other type of subcategories. Other embodiments may be subcategorization by age or gender.

According to some embodiments, the machine learning algorithm is trained based on HOG (Histogram Of Gradients) and SVM. According to some embodiments, the machine learning algorithm is trained using DPM to be used as a detector.

According to some embodiments, a first machine learning algorithm is used to identify human-in-water candidates in the image. This first machine learning algorithm may scan all the parts of the image with a sliding window detector in order to identify the humans-in-water candidates. Then, another machine learning algorithm, such as an object classification convolutional neural network, may be applied only on the candidates/proposals that the first machine learning algorithm outputs (using a pre-defined threshold score). The object classification convolutional neural network may also be first trained using a training set of underwater images.

According to another embodiment, the object classification convolutional neural network performs both the identification of humans-in-water candidates, and the classification said candidates. Further explanations will be provided with reference to FIG. 14.

Figure 7:
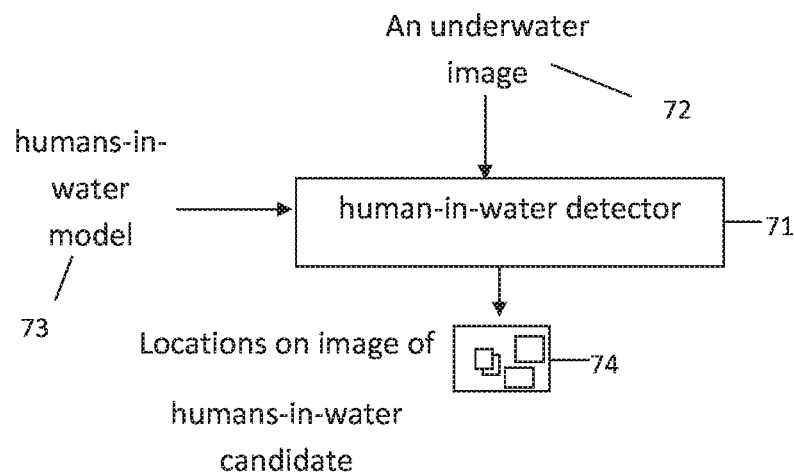
FIG. 7 illustrates an embodiment of a machine learning based humans-in-water detector.

FIG. 7 generally sketches a possible machine learning based humans-in-water detector 71, which comprises at least a machine learning algorithm for detecting humans-in-water candidates in the underwater images. This machine learning algorithm may have been trained as explained e.g. in reference to FIG. 6.

The detector 71 may receive as input at least an input underwater image 72, which was taken by the underwater camera 22. The detector 71 may use at least a humans-in-water model which is the output of the training phase detailed above (step 73, which is the same as step 64 of FIG. 6). According to some embodiments, the detector 71 may compare each part of the underwater image with the humans-in-water model in order to detect humans-in-water candidates.

The output of the detection method may be a set of humans-in-water candidates 74, each associated with a location, and possibly other information, such as a grade associated with the detector's certainty, and possibly the association to a sub-category, associated, for instance, with posture (as detailed later).

There may be spatial overlaps between the candidates. The same candidate may be associated with more than one sub-category. The candidate's location may be described by a rectangle (associated with the bounding-box of the human candidate), by a silhouette, by a binary bitmap, or any other spatial description.

Figure 8:
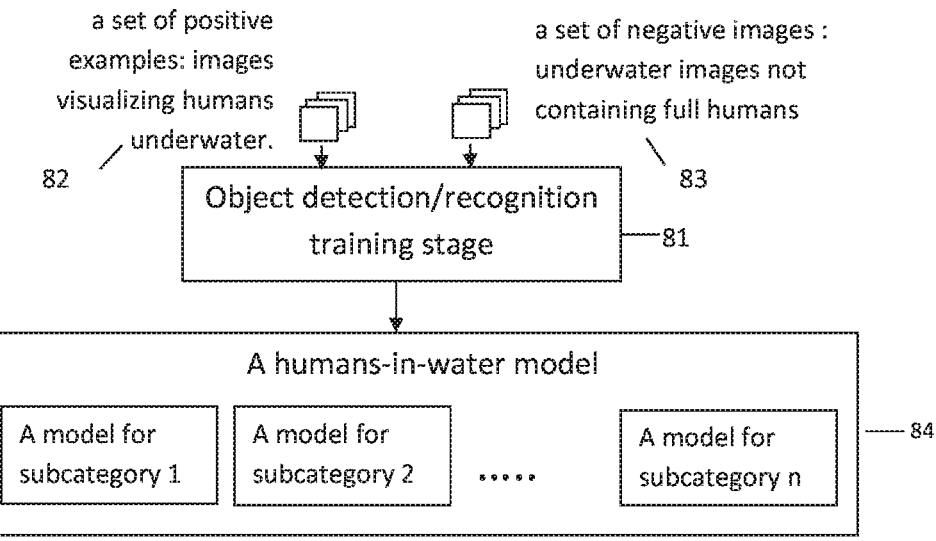
FIG. 8 illustrates an embodiment of the training stage of a machine learning based humans-in-water detector that is trained to distinguish between subcategories
Figure 9:
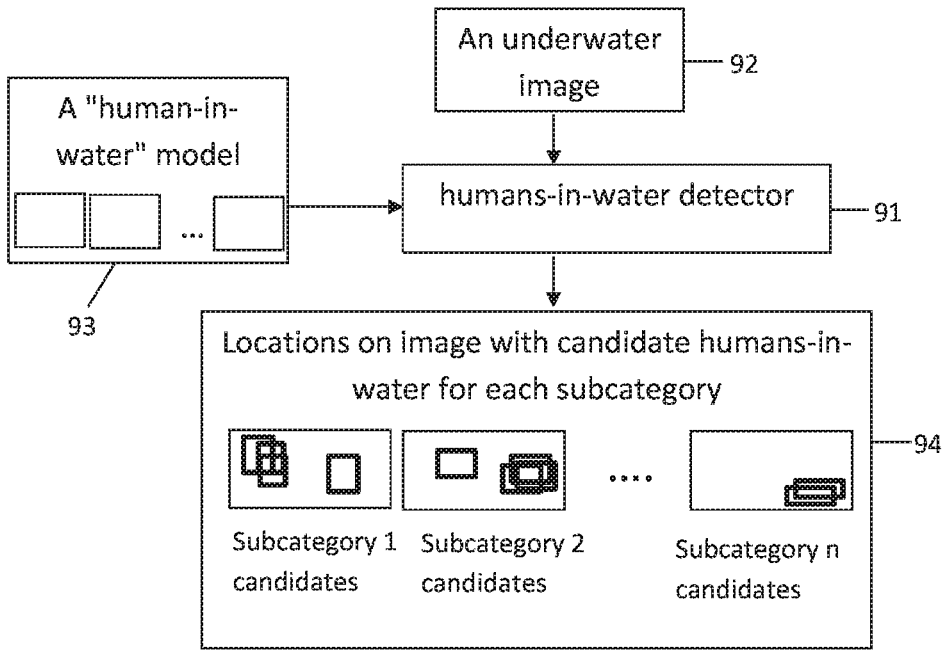
FIG. 9 illustrates an embodiment of a machine learning based humans-in-water detector that associates image parts with different models, each model being associated to a subcategory, in order to find humans-in-water candidates.

FIG. 8, and FIG. 9 illustrate the training and detection stages of an embodiment of a detector for which the humans-in-water model comprises different subcategories. References 81, 82 and 83 are similar to references 61, 62, and 63, respectively.

In this embodiment, the output of the training stage is a humans-in-water model which comprises a plurality of models, each model being associated to a different subcategory, with particular characteristics for each subcategory as illustrated by reference 84. An example of subcategory is a posture of the human in water. Thus, the model of a given subcategory can represent how the human would appear in the underwater image for this given subcategory (e.g. different models can be created for different postures, or for different genders of the humans, etc.).

As discussed above in the context of FIG. 6, the machine learning algorithm that is used for building the plurality of models may also be based on the SVM (Support Vector Machines) technology or any neural network based technology, including the deep learning technology, CNN (Convolutional neural networks), Decision Trees/Forests based technologies, Bag-of-words based technology, HOG (Histogram Of Gradients) based technology, DPM (Deformable Parts Model) based technology, or any other classification/modelling technology.

In FIG. 9, the underwater image is compared to each of the models, wherein each model is associated to a subcategory. References 91 and 92 are similar to references 71 and 72, respectively. Reference 93 is similar to reference 84, but as illustrated, a plurality of human-in-water models is used. The output of the detector 91 when applied on an input underwater image may comprise a set of candidates for humans-in-water locations, while associating each candidate to a model of a particular subcategory.

Figure 10:
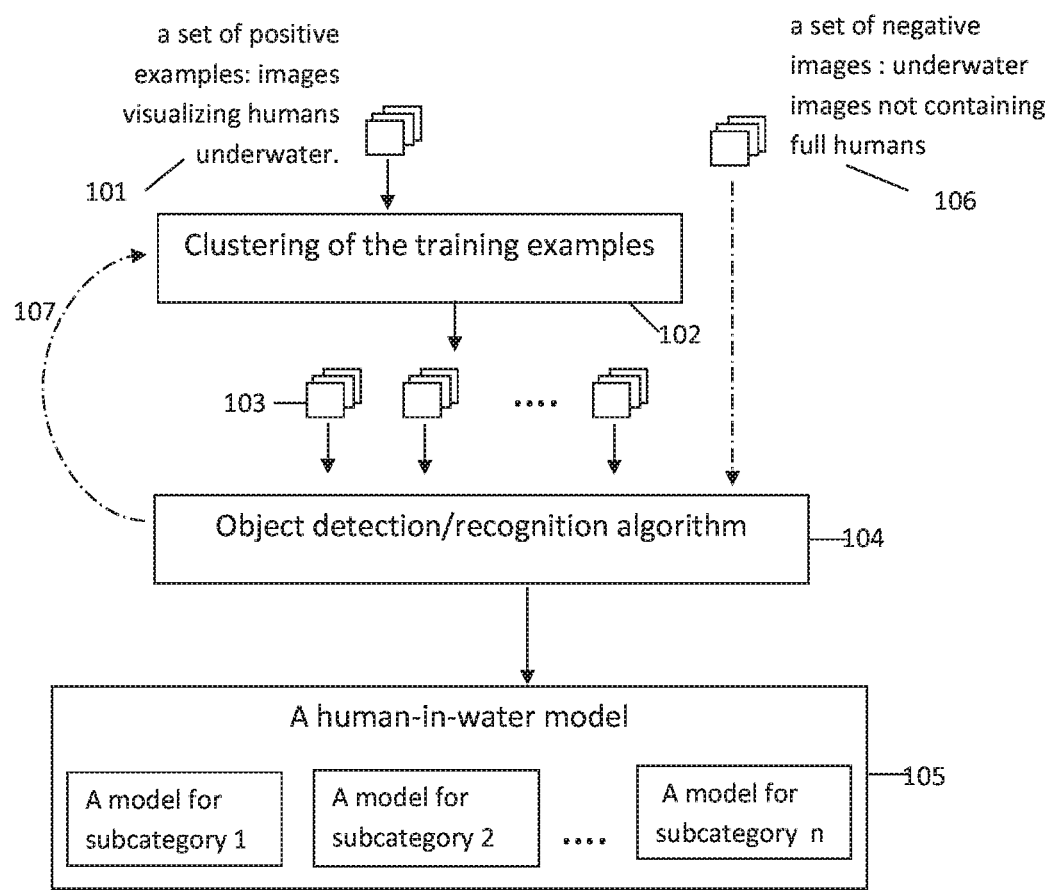
FIG. 10 illustrates an embodiment of clustering the input training underwater images containing humans-in-water.

According to some embodiments, the machine learning algorithm which attempts to detect humans-in-water candidates in the underwater is trained based on the input of a training set of underwater images clustered to subcategories. In particular, the underwater images of the training set which comprise a human ("positive" examples) may be pre-clustered by subcategory. (FIG. 10). As shown in FIG. 10, the positive training images 101 may be divided using a clustering method 102 into sets, each set associated with a subcategory 103. Embodiments for pre-clustering methods are described in the context of FIG. 12 below. The pre-clustered images may then be fed to the detection algorithm, in order to construct the different subcategories' models (105, which is the same as 84).

According to some embodiments, when the training algorithm attempts to create a model representing each subcategory, it may use also the negative examples (106, which is the same as 83). The clustering and modelling may be performed in an iterative manner (the dotted arrow 107 represents the option for the method to be iterative). For instance, using initial pre-clustering results, subcategory models are created. Then, all positive examples may be assigned to a subcategory by the model it best fits, then the models are re-trained. This may be repeated for a few finite number of iterations.

Figure 11:
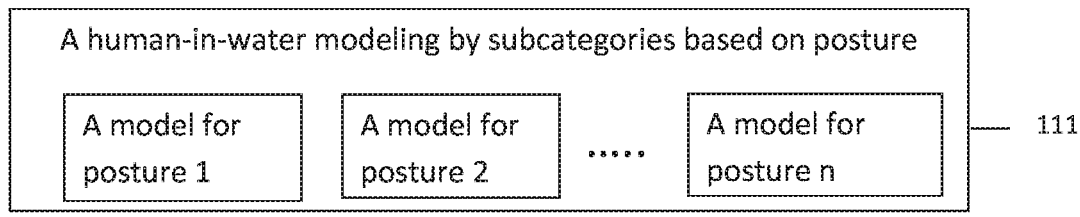
FIG. 11 illustrates a humans-in-water model comprising different models, each model being associated to a different subcategory (such as a different human posture).

As illustrated in FIG. 11, the subcategories may be implicitly or explicitly associated with posture of the human in water. An explicit association includes the fact that the candidates were explicitly associated to a posture, e.g. by a human annotator. An implicit association includes the fact that an algorithm that is based on certain descriptors extracted from the underwater image automatically clustered the data, wherein the resulted clustering turns out to be associated with posture.

The expression "posture" here refers to the way the human appears in the 2D projection in the image plane (and not to the 3D posture of the human in the 3D space). Examples of posture include e.g. appears horizontally in the image plane with head to the right and feat to the left, appears vertical in the image plane with head down and legs up, head facing camera and legs occluded, etc.

Figure 12:
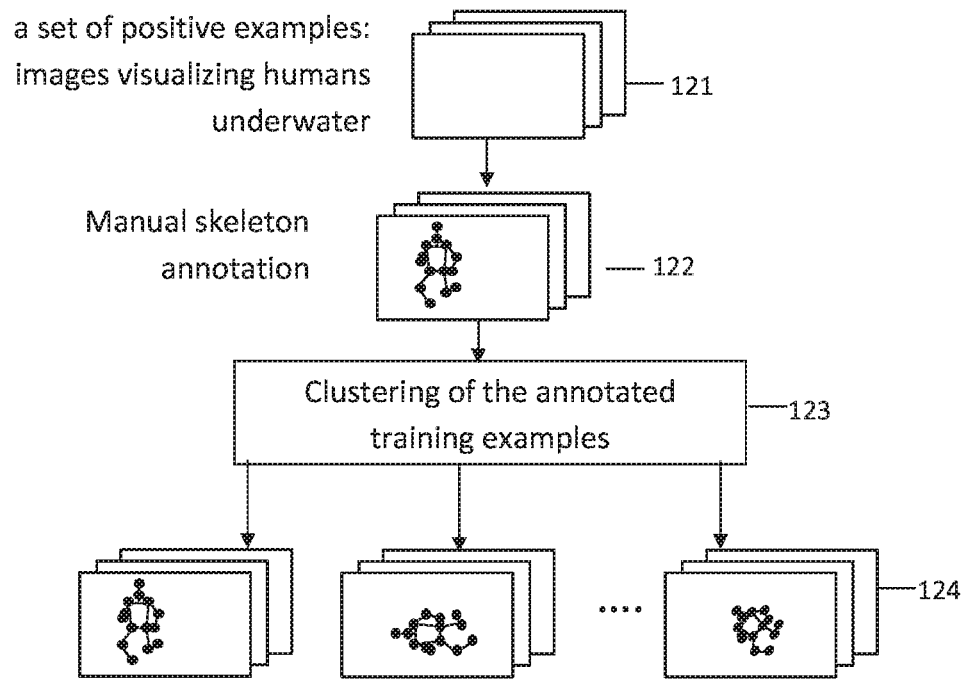
FIG. 12 illustrates a possible embodiment for annotating and pre-clustering the training underwater images which comprise humans-in-water (positive images) by their posture.
Figure 13:
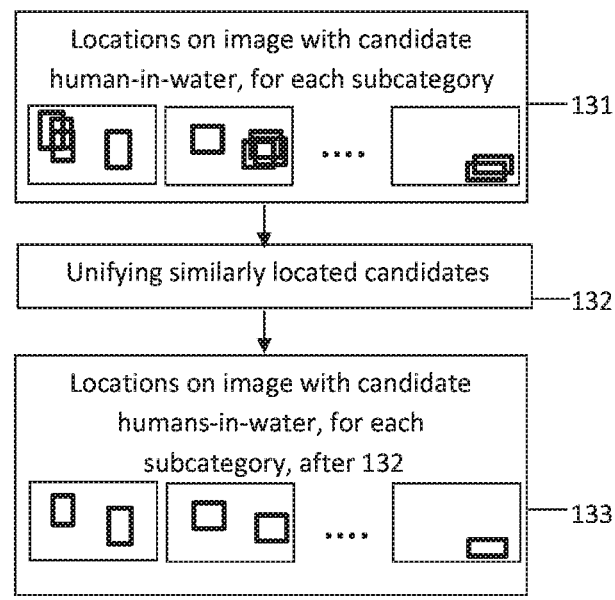
FIG. 13 illustrates an optional procedure for reducing overlapping candidates identified by the humans-in-water detector in the underwater images.

FIG. 12 illustrates an embodiment for a method for pre-clustering the images (an embodiment for how step 102 may be implemented). As mentioned above, according to some embodiments, the underwater images of the training set may be manually annotated as positive (including human) or negative ones (not including a full human). According to some embodiments, the positive examples may be further annotated by a manual mark of the location of the human in the image. This additional information can be used in the clustering procedure. The annotation may be, for instance, in the form of a rectangle that is a bounding-box of the human. In such a case the pre-clustering method may use the aspect ratio of the bounding box and/or the visual data in order to divide the examples into clusters. Another embodiment is that each positive example is manually pre-annotated by a subcategory, associated, for instance, to a posture (The user defines for each image to which subcategory the image belongs). In this case the clustering is a manual one with no algorithm involved. Another option for annotation is that manual annotations are provided by some details on the location of the body parts (without explicit posture annotation). According to some embodiments, the annotations may define a set of points that are each associated with a certain joint of the body. For example, a point for each elbow, knee, shoulder, etc (this list being not limitative). Then, a vector representing this point may be built to represent each image. Such annotations provide information that allows to then automatically pre-cluster the underwater images of the training set by the human posture.

Reference 122 shows an embodiment of annotation in which 14 points selected by a user describe together a "skeleton" of the human body. The positive examples 121 may be each annotated that way, and using these annotations, an automatic pre-clustering may be performed (step 123), before training the object detection/recognition algorithm for building models for each subcategory using this pre-clustering.

Embodiments for pre-clustering the positive underwater images, using the "skeleton" annotations, comprise e.g.:
  using predefined clusters: each cluster may be associated with say certain tilts of the torso, the legs and arms, or any other descriptions associated with the posture of the body; in this case each example is assigned a cluster without depending on the other available examples;
  data-driven clustering: this may comprise extracting tilt information of the body parts for each example, or any other descriptions associated with the body posture, and defining a vector of descriptors for each example. The method may then comprise clustering the data using any unsupervised clustering method: KMeans, mean-shift, etc. The output of the pre-clustering method may be a division of the training examples into subsets, each subset being associated to a posture or to a group of postures (reference 124).

According to some embodiments, pre-clustering can be used to pre-cluster the underwater images depending on the age and/or gender of the human(s) appearing in the underwater images. Similar pre-clustering methods to those described above can be used.

As already mentioned, the object detection/recognition algorithm may output a plurality of humans-in-water candidates per image, which may be overlapping. These humans-in-water candidates may each belong to a different subcategory (such as a posture). Each candidate may be associated to a confidence grade (indicating for instance the pertinence of the association of the model of a subcategory with respect to the image part covered by the human-in-water candidate). This confidence grade may be computed by the object detection/recognition algorithm. This is illustrated in step 131, which is similar to step 94. In step 131, the various humans-in-water candidates that were detected for each subcategory for a given image are illustrated.

In order to cope with the overlap of the humans-in-water candidates, it is possible to unify similarly located candidates to serve as one candidate (step 132). According to some embodiments, a known per se method called "nms" (non-maximal-suppression) may be used. The "nms" method selects only the candidates that have the maximal confidence grade in a certain neighbourhood, and throws away all other candidates. According to other embodiments, it is possible to recognize a set of highly overlapping candidates and to replace them by one candidate that is created by an average location. In particular, the location of the new candidate may be the center of gravity of the overlapping candidates, while weighting each candidate by its associated confidence grade.

The procedure of unifying similarly located candidates (overlapping candidates) may be performed for all humans-in-water candidates in an image as one set (that is to say even if they are associated to different subcategories), or for each subcategory separately. The latter option is illustrated in step 133.

Different object detection and recognition algorithms have different detection/classification accuracy and require different computational resources. Usually accuracy comes on the cost of speed and vice versa. Therefore, when processing should be performed in real-time and the computation resources are limited, one has to consider both aspects of accuracy and processing time when selecting the algorithm to use. An embodiment comprises combining two or more detection/recognition algorithms and using them in a sequential manner: use a less resources demanding algorithm for scanning the whole data, and use a more accurate but more resource demanding algorithm in a later processing stage, after some filtering was done by the less demanding algorithm.

Figure 14:
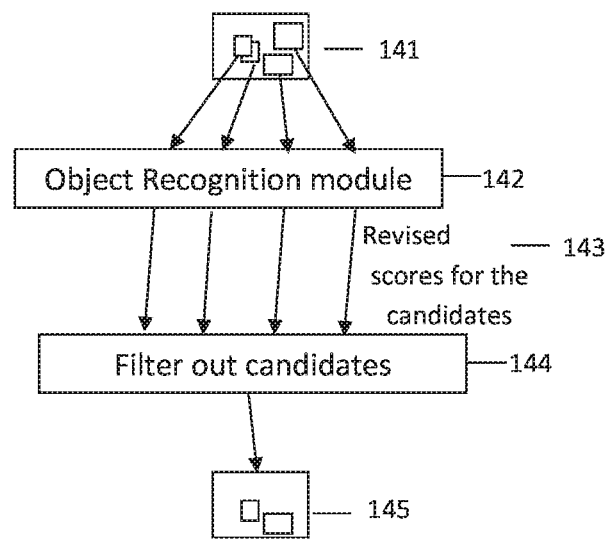
FIG. 14 illustrates an embodiment in which a more accurate recognition method is used, in order to filter out part of the candidates or to change their level of confidence.

FIG. 14 illustrates such an embodiment. In this embodiment, a first object detection algorithm (machine learning algorithm) is used to scan all the parts of the image with a sliding window detector in order to identify the humans-in-water candidates (step 141). As mentioned, each candidate may be given a confidence grade. Examples of such object detection algorithms were already provided.

Then, a second machine learning algorithm, such as an object classification algorithm, may be applied only on the candidates that the first machine learning algorithm outputs (step 142). This second machine learning algorithm may be chosen as more accurate than the first machine learning algorithm. Revised and improved confidence grades are obtained for each candidate (step 143). This may further allow filtering-out candidates that are recognized with high-confidence (that is to say above a given threshold) by the second machine learning algorithm as not being humans-in-water (step 144, resulting output 145).

A (not limitative) embodiment for such a combination is that the first algorithm used as the first stage is a HOG based detector using SVM, with or without the DPM scheme and the second algorithm is one based on the deep learning technology. Another (not limitative) embodiment is that both algorithms are based on the deep learning technology, while the first uses a certain number of layers in the neural network, and the second one uses a deeper neural network (with more layers, and maybe wider layers).

As described above, the subcategorization, e.g. by posture may serve the humans-in-water detection stage of the method by making it more accurate.

Figure 15:
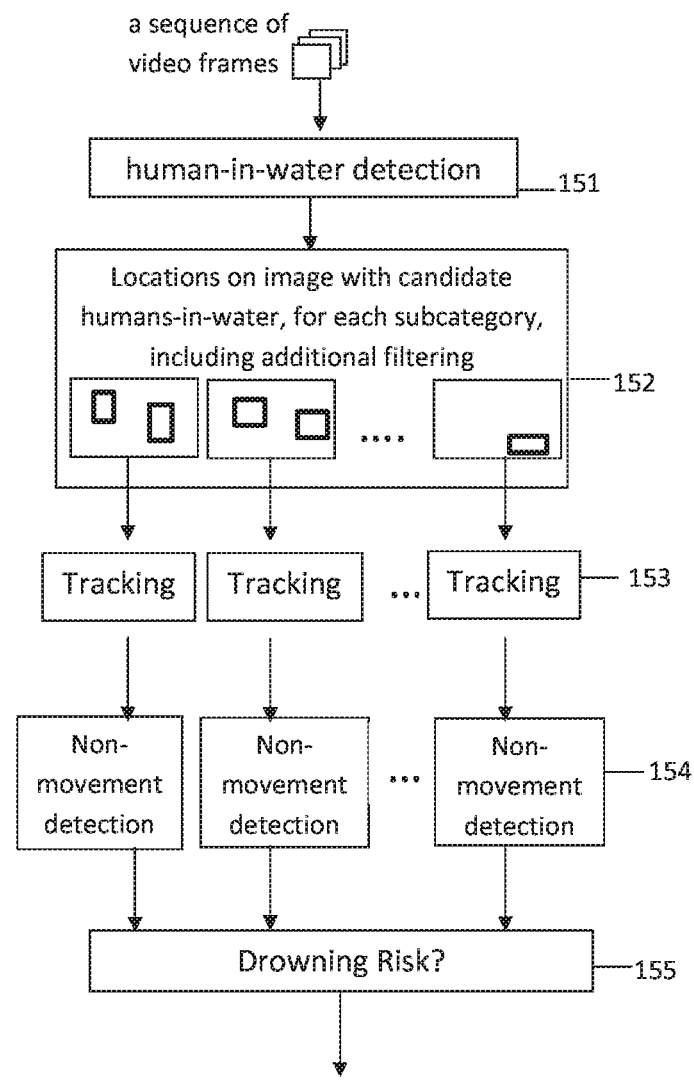
FIG. 15 demonstrates a drowning detection method using tracks, each track being associated to a different subcategory (such as posture).

This subcategorization may also be used in the step of drowning detection. FIG. 15 illustrates in steps 151, 152 the fact that humans-in-water candidates may be obtained for each image, wherein the humans-in-water candidates are divided by subcategory. These steps were already commented with respect to the previous embodiments.

According to an embodiment, a multi-object tracker may associate each humans-in-water candidate with an active track or a new track. The track may track objects that change in time and in location.

Since one of the system's aim is drowning detection, it is of interest to recognize situations in which a human is submerged and does not move. Therefore, the method may be interested in tracks in which the location and posture did not change over time. This may be accomplished by assigning different tracks for different postures 153. For each active track it may be possible to estimate its "amount" of movement at a certain temporal window 154, and in case of non-movement, or a movement smaller than a certain pre-defined for a pre-defined amount of time that is associated with a drowning risk, the method may output the severity of the event, and the system may output a warning, or an alarm, depending on the severity.

The different steps (as described in the various embodiments) of identifying the humans in water candidates in the images, tracking said candidates and detecting a risk of drowning may be performed based on the images taken by a single camera. If a plurality of camera are used (for example—but not limited to—when each camera covers a different zone), these different steps may be performed for each camera separately. The system may then aggregate the different drowning risks computed for each camera for taking the appropriate safety measure.

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of detecting human drowning, comprising, by a system comprising a processing unit:
    performing detection of humans in a sequence of underwater images taken by a single static camera in an operating zone, for identifying humans-in-water candidates in the underwater images,
    said detection using at least a deep learning neural network differentiating between humans and non-humans in the sequence of underwater images,
    tracking humans-in-water candidates throughout this sequence, and
    detecting human drowning risk,
    wherein the system is operable to detect human drowning risk without calibration with respect to said operating zone.

2. The method according to claim 1, comprising associating said candidates in each image with a model among a plurality of different models, each of the model of said plurality of different models being associated to a different subcategory.

3. The method according to claim 2, wherein each model is obtained by training a machine learning algorithm based on the input of a training set of underwater images clustered to subcategories.

4. The method according to claim 3, wherein each subcategory is associated with a human posture.

5. The method according to claim 3, comprising a step of pre-clustering the underwater images of the training set which comprise a human, the pre-clustering comprising:
    manually annotating humans' joints, and
    automatically pre-clustering the underwater images based on postural features extracted from said annotations.

6. The method according to claim 5, wherein the automatic pre-clustering uses pre-defined definitions of postural features to pre-cluster the underwater images, or at least a data-driven clustering method.

7. The method according to claim 2, comprising replacing overlapping candidates associated with a model of the same subcategory by a new candidate with a weighted average location, wherein:
    each candidate comprises a score reflecting the pertinence of the association of the model of a subcategory with respect to the part of the underwater image covered by the candidate, and
    the location of the new candidate that replaces the overlapping candidates is defined by weighting the overlapping candidates' locations based on their said scores.

8. The method according to claim 1, comprising using another machine learning algorithm to classify if the candidates comprise a human, wherein said machine learning algorithm comprises a deep convolutional neural network.

9. The method according to claim 2, comprising:
tracking said candidates throughout the sequence of images, by taking into account the subcategory to which each candidate is associated with,
detecting a lack of movement of the candidates, in order to detect human drowning risk.

10. The method of claim 1, used for detecting human drowning risk in at least a residential above-ground pool.

11. A system for detecting human drowning, comprising at least one underwater static camera configured to take at least a sequence of underwater images in an operating zone, the system being configured to:
detect humans in the sequence of underwater images, for identifying humans-in-water candidates in the images, said detection using at least a deep learning neural network configured to differentiate between humans and non-humans in the sequence of underwater images,
track humans-in-water candidates throughout this sequence, and
detect human drowning risk,
wherein the system is operable to detect human drowning risk without calibration with respect to said operating zone.

12. The system of claim 11, further configured to raise an alarm based on the detection of human drowning risk.

13. The system according to claim 11, comprising a single underwater camera.

14. The system according to claim 11, wherein the system uses an energy source comprising solar panels.

15. The system according to claim 11, configured for detecting human drowning risk in at least a residential above-ground pool.

16. The system according to claim 11, wherein the system is operable to detect human drowning risk in a swimming pool using a single underwater camera for said swimming pool.

17. The system according to claim 11, wherein the system comprises a single underwater camera, and uses an energy source comprising solar panels.

18. The system of claim 11, said deep learning neural network comprising a convolutional neural network.

19. A non-transitory device readable by a machine, tangibly embodying a program of instructions executable by the machine to perform a method of detecting human drowning comprising:
performing detection of humans in a sequence of underwater images taken by a single static camera in an operating zone, for identifying humans-in-water candidates in the images, said detection using at least a deep learning neural network differentiating between humans and non-humans in the sequence of underwater images,
tracking humans-in-water candidates throughout this sequence, and
detecting human drowning risk without requiring calibration with respect to the operating zone.

* * * * *